United States Patent [19]
Beals

[11] 3,867,045
[45] Feb. 18, 1975

[54] TUBE CONNECTOR

[75] Inventor: Max D. Beals, Riverside, Calif.

[73] Assignee: Amax Aluminum Company, Inc., San Mateo, Calif.

[22] Filed: Mar. 25, 1974

[21] Appl. No.: 454,288

[52] U.S. Cl. .............................. 403/190, 403/235
[51] Int. Cl. ............................................ F16b 9/00
[58] Field of Search .......... 403/234, 237, 232, 233, 403/262, 230, 264, 241, 231, 235, 189, 190, 187, 192; 52/758 H, 758 R, 656, 665

[56] References Cited
UNITED STATES PATENTS

| | | | |
|---|---|---|---|
| 2,755,114 | 7/1956 | Becker | 248/188 UX |
| 2,972,395 | 2/1961 | Peremi | 403/231 |
| 3,131,899 | 5/1964 | Luhrs | 403/189 X |
| 3,159,440 | 12/1964 | Courtwright | 52/758 H X |
| 3,778,175 | 12/1973 | Zimmer | 403/187 |

Primary Examiner—Andrew V. Kundrat
Attorney, Agent, or Firm—Kasper T. Serijan; Eugene J. Kalil

[57] ABSTRACT

A U-shaped tube-connecting clip is provided having a substantially rectangular configuration formed from strip material, the U-shaped clip having a substantially flat bottom at its bight with a pair of legs depending upwardly from opposite edges of the said bight, the free edges of the bight being in the form of extending ledges for interference engagement with a rectangular tube upon axial assembly thereof. The legs of the clip are provided with indexing shoulders for contacting the end of the receiving tube during assembly, the tube being provided with lanced detents on opposite walls thereof in the form of inwardly projecting snap retention shoulders which provide spring-biased engagement with the ledges of the clip following the insertion thereof.

7 Claims, 8 Drawing Figures

PATENTED FEB 18 1975　　3,867,045

TUBE CONNECTOR

This invention relates to a U-shaped tube-connecting clip and to tube-connecting assemblies thereof.

STATE OF THE ART

It is known to assemble square metal tubing (e.g. aluminum tubing) into framework for lightweight building construction. Generally, the tube ends are notched by hand to leave one or two ear tabs for use in coupling the tube parts together. Angle brackets or flat splice plates are also used.

The foregoing methods have certain disadvantages. For one thing, it is time consuming in the field or at the factory to measure the tube ends for notching. In addition, the tabs are not generally provided with holes for receiving a starting screw. Moreover, if the notch is not carefully made, the joint has a poor appearance and generally does not have good strength, especially where the tab is the same thickness as the wall thickness of the tube.

It would be desirable to provide a simple mechanical means of easily securing an end of rectangular tubing (e.g. square tubing) to the side and at an angle (e.g. at right angles) to another tube either in the field or in the factory.

The present invention overcomes the foregoing disadvantages and provides a new and improved U-shaped tube-connecting clip for producing substantially rigid joints from tubes of rectangular cross section, particularly tubes of square cross section.

OBJECTS OF THE INVENTION

It is thus the object of the invention to provide a tube-connecting clip capable of being used in the field as well as at the factory in producing lightweight frame structures.

Another object is to provide a tube-connecting assembly in which a U-shaped tube-connecting clip is employed as a means of producing a substantially rigid assembly.

A further object is to provide a mechanical joint between two tubes of rectangular cross section.

These and other objects will more clearly appear when taken in conjunction with the following disclosure and the accompanying drawing; wherein.

STATEMENT OF THE INVENTION

The invention provides a U-shaped tube-connecting clip of substantially rectangular configuration, the clip being formed from strip material and comprising a substantially flat web or platform at its bight with a pair of spaced legs integral with the opposite edges of said bight and extending upwardly therefrom, the remaining free edges of the bight being in the form of extending ledges.

Each of the legs of the clip has an inwardly projecting indexing shoulder formed laterally thereon at substantially the same distance as the other, the shoulders serving as indexing stop means when the clip is inserted into the open end of a conforming rectangular tube.

In order to provide a locking mechanism for a tube connection produced from the clip, the rectangular tube has lanced detents formed as slitted openings on opposite walls thereof which provide within the tube inwardly projecting snap-retention means or shoulders for snap-locking the clip in place by spring-biased engagement with the extending ledges of said clip when the clip is force-fitted into the rectangular tube past said means. The lanced detents are located a predetermined distance in from the end of the tube and correspond substantially to the distance between the indexing shoulders of the U-shaped clip and the bight of the clip; that is to say, the distance of the lanced detents from the tube end is determined to provide sufficient play to enable the inserted clip to lock in place. The foregoing mechanism will be clearly apparent from the figures of the attached drawing.

Figure 1:
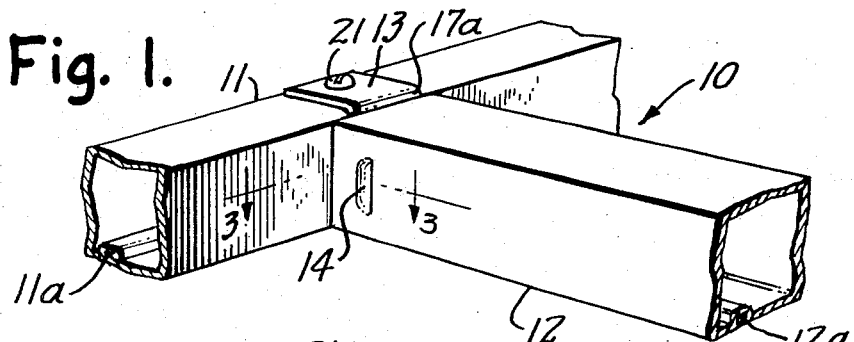
FIG. 1 is illustrative of a tube assembly in perspective involving two square tube portions connected at right angles to each other via the U-shaped tube-connecting clip of the invention.

FIG. 1 is a perspective view of a joint assembly referred to generally by numeral 10 comprising rectangular tube portion 11 mechanically joined at right angles to rectangular tube portion 12 (the tubes have a square cross section) by means of U-shaped clip 13. The opposite walls of tube 12 are provided with lanced detents 14 as shown. The two tubes are formed from strip material, e.g. metal strip, such as aluminum, by folding over together the longitudinal edges of the strip to form lock seams 11a and 12a as shown.

Figure 2:
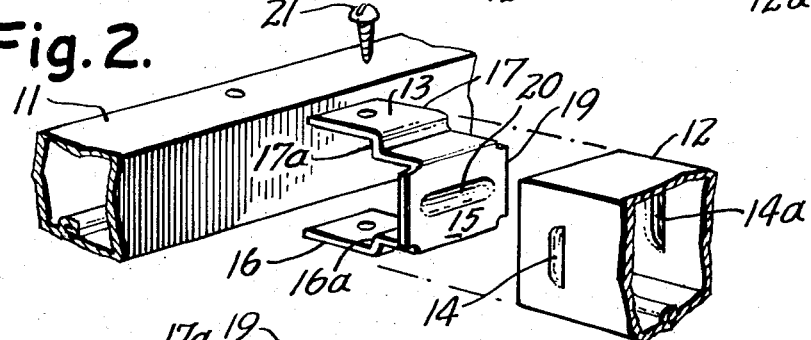
FIG. 2 is a three-dimensional exploded view of the cooperating elements of FIG. 1.

The elements making up the mechanical joint of FIG. 1 are shown more clearly in the exploded view of FIG. 2 which depicts U-shaped clip 13 comprising a substantially flat web or platform at bight 15 with a pair of legs 16, 17 integral therewith and extending from the platform substantially at right angles therefrom. As will be noted, the legs are indented with a substantially right angle bend intermediate the length thereof to provide indexing shoulders 16a and 17a. The free edges of the bight extend outwardly as ledges 18, 19 and are designed to make interference contact with lanced detents 14 and 14a of FIG. 2. By lanced detents is meant that slit openings are formed as shown in FIG. 2 so that the detents are in the form of inwardly projecting, snap-retention shoulders shown more clearly in FIG. 3 which is a cross section taken along line 3—3 of FIG. 1, the snap-retention shoulders providing spring-biased engagement with the ledges of the U-shaped clip when the clip is force-fitted into the rectangular tube past said shoulders as shown in the operation sequence of FIGS. 3 through 6. The platform or web at the bight 15 is provided with a deformed elongated dimple 20 to stiffen it by increasing its cross sectional modulus. The legs are provided with holes to receive sheet metal screw 21 also shown in FIG. 1. The legs of the clip will generally have a larger gage size than the tube material. For example, if the tube material has a gage of 0.03 inch, then the clip preferably has a thickness of 0.04 inch or higher.

The length and width of platform or web of the bight 15 is calculated to slide within the tube and make interference contact with the snap-retention shoulders of the tube.

Figure 3:
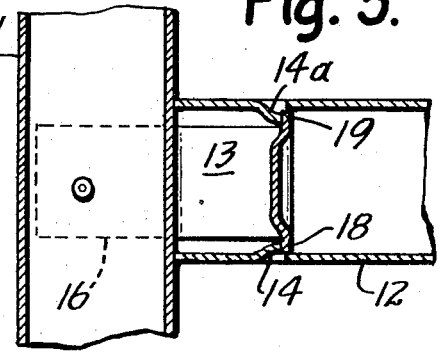
FIG. 3 is a cross section of the assembly of FIG. 1 taken along lines 3—3 at the mechanical joint.

Thus, as will be noted in FIG. 3, the U-shaped clip with the extending ledges 18, 19 is inserted into the end of tube 12 and the ledges caused to make interference engagement with the snap-retention shoulders 14 and 14a until the ledges clear the shoulders and lock in place by the spring-biased action of said shoulders as shown. In the meantime, the indexing shoulders of the legs of the clip contact the end of the tube as a stop, thereby providing a fairly rigid mechanical joint following snap engagement of the two elemental parts together.

Figure 4:
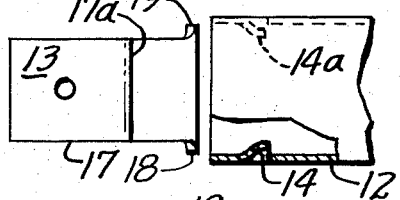
FIGS. 4 to 6 illustrate the sequential steps in the insertion of the U-shaped clip into an end of a square tube.
Figure 5:
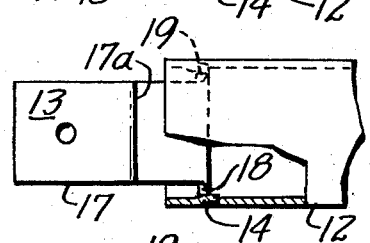
Figure 6:
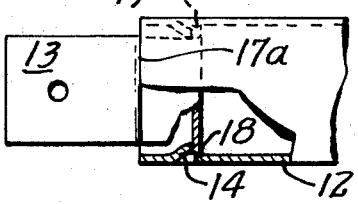

The sequential steps of inserting the clip are shown in FIGS. 4 to 6. Note in FIG. 5 the partial insertion of the clip with ledge 18 making interference engagement with snap-retention shoulder 14 until the ledge clears the shoulder and is locked thereby as shown in FIG. 6. In the meantime, indexing shoulder 17a on the leg 17 of the clip strikes against the end of tube 12 as the ledge clears the snap-retention shoulder. This is also shown in FIG. 1.

Figure 7:
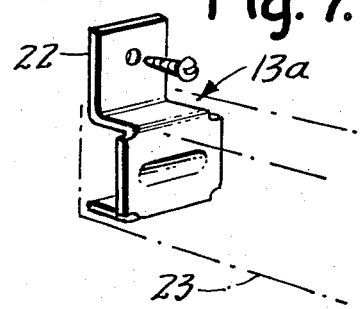
FIG. 7 is illustrative of one form of a U-shaped clip in which one of the legs is bent at right angles to itself for use in the mounting thereof on a surface.

Another modification of the U-shaped clip 13a is shown in FIG. 7 in which one of the legs thereof is made longer than the other and bent at right angles to itself to provide a mounting tab 22 so that the clip together with its connected tube shown phantomly by numeral 23 is fastened to a surface at right angles to the longitudinal axis of the tube.

The term "rectangular shape" employed herein is meant to include any four sided right angle shape such as an elongated rectangle or a square.

Figure 8:
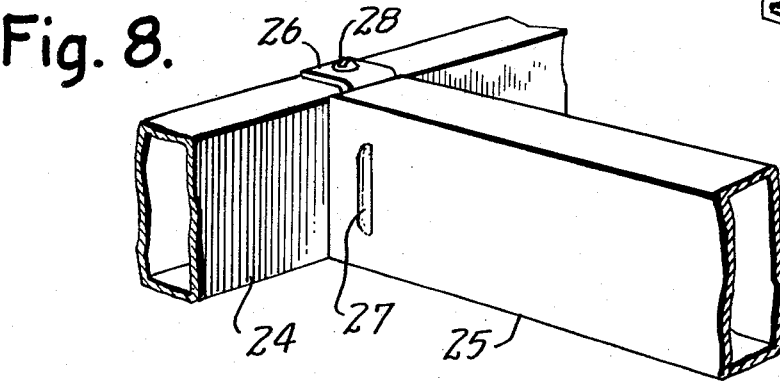
FIG. 8 is an assembly similar to FIG. 1 except that the rectangular cross section has a shape of an elongated rectangle.

A tube assembly having a cross section which defines an elongated rectangle is shown in FIG. 8 comprising tubes 24, 25 coupled at right angles to each other using the U-shaped clip 26 of the invention, the legs of the clip being fastened to tube 24 via a sheet metal screw 28. Lanced detents 27 are provided on opposite walls of tube 25 in the form of inwardly projecting, snap-retention shoulders as illustrated in FIGS. 4 to 6.

In addition to providing a tube-connecting assembly, the invention also provides a mechanical joint comprising one rectangular tube joined at an angle to another rectangular tube.

The joint comprises a first tube portion of rectangular configuration having connected thereto a U-shaped clip having a pair of legs which embraces the first tube portion transversely and is fastened thereto (note FIG. 1). The U-shaped clip has a substantially rectangular configuration and has a platform or web at its bight with the legs depending from opposite edges thereof, the free edges of the bight between the legs being in the form of extending ledges. Each of the legs has indexing shoulders laterally formed therein at the same distance from the bight.

The bight end is inserted axially into a second rectangular tube portion to provide a substantially right angle joint (FIG. 1), the tube having inwardly projecting snap-retention means which lockingly engage the ledges of the bight.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A mechanical joint comprising one rectangular tube joined at an angle to another, said joint comprising, a first hollow tube portion of rectangular configuration, a U-shaped tube-connecting clip having a pair of legs which embraces transversely said first tube portion with the legs fastened thereto, said U-shaped tube-connecting clip being of substantially rectangular configuration and having a substantially flat platform or web at its bight with said pair of legs depending from opposite edges of said bight, the free edges of said bight between the legs being in the form of extending ledges, each of said legs having indexing shoulders laterally formed therein at a predetermined distance from said bight, a second rectangular hollow tube portion having an open end into which the bight end of said clip is inserted in interference engagement therewith having inwardly projecting snap-retention means which provide spring-biased engagement with the free ledges of said clip following the insertion thereof, said snap-retention means being located a predetermined distance in from the open end of the tube corresponding substantially to the said predetermined distance between the indexing shoulders of the U-shaped clip and the bight thereof, such that a substantially rigid mechanical joint is formed in which the indexing shoulders of the clip are held firmly against the end of said second tube with the ledges of the bight in engagement with the snap-retention means of the tube by virtue of the spring-biased action of said snap-retention means.

2. The mechanical joint of claim 1, wherein the inwardly projecting snap-retention means of said second tube portion comprise lanced detents.

3. The mechanical joint of claim 1, wherein the rectangular tubes forming the joint have a substantially square cross section.

4. A tube-connecting assembly comprising a hollow rectangular tube portion with a U-shaped tube-connecting clip snap-fitted therein, said U-shaped tube-connecting clip being of substantially rectangular configuration and having a substantially flat platform at its bight with a pair of spaced legs depending from opposite edges of said bight with the free edges of said bight between the legs being in the form of freely extending ledges, at least one of said legs having an indexing shoulder laterally formed therein at a predetermined distance from said bight, said rectangular hollow tube portion receiving the bight end of said clip in axial snap-fitted engagement therewith, said tube portion having inwardly projecting snap-retention means located on opposite walls of said tube which provide spring-biased engagement with the free ledges of said clip, said snap-retention means being located a predetermined distance in from the open end of the tube corresponding substantially to said predetermined distance between the at least one indexing shoulder of the U-shaped clip and the bight thereof, such that the tube-connecting assembly is characterized in that the said at least one indexing shoulder of the clip engages the end of the tube with the free ledges of the bight engaging the snap-retention means of the tube by virtue of the spring-biased action of said snap-retention means thereby forming a substantially rigid tube connection.

5. The tube-connecting assembly of claim 4, wherein said rectangular tube portion has a substantially square cross section.

6. A tube-connecting assembly comprising a hollow rectangular tube portion with a U-shaped tube-connecting clip snap-fitted therein, said U-shaped tube-connecting clip being of substantially rectangular configuration and having a substantially flat platform at its bight with a pair of spaced legs depending from opposite edges of said bight, the free edges of said bight between the legs being in the form of freely extending ledges, at least one of said legs having an indexing shoulder laterally formed therein at a predetermined distance from said bight, said rectangular hollow tube portion receiving the bight end of said clip in axial snap-fitted engagement therewith, said tube portion having lanced detents on opposite walls of said tube in the form of inwardly projecting snap-retention shoulders which provide spring-biased engagement with the free ledges on the bight of said clip, said snap-retention shoulders being located a predetermined distance in from the open end of the tube corresponding substantially to the predetermined distance between the at least one indexing shoulder of the U-shaped clip and the bight thereof, such that the tube-connecting assembly is characterized in that the said at least one indexing shoulder of the clip engages the end of the tube with the free ledges of the bight engaging the snap-retention shoulders of the tube by virtue of the spring-biased action of said snap-retention shoulders, thereby forming a substantially rigid connection.

7. The tube-connecting assembly of claim 6, wherein said rectangular tube portion has a substantially square cross section.

* * * * *